United States Patent [19]

Toth

[11] 4,377,428

[45] Mar. 22, 1983

[54] METHOD OF FRICTION WELDING

[75] Inventor: Leslie Toth, Brookfield, Conn.

[73] Assignee: Branson Ultrasonics Corporation, Newtown, Conn.

[21] Appl. No.: 394,710

[22] Filed: Jul. 2, 1982

Related U.S. Application Data

[62] Division of Ser. No. 273,628, Jun. 15, 1981, Pat. No. 4,352,711.

[51] Int. Cl.³ ............................................. B29C 27/08
[52] U.S. Cl. .................................. 156/73.5; 156/293; 156/308.2; 156/580; 228/112; 264/68
[58] Field of Search ............... 156/73.5, 580, 69, 293, 156/308.2; 228/2, 112; 264/68; 425/DIG. 22

[56] References Cited

U.S. PATENT DOCUMENTS

| | | | |
|---|---|---|---|
| 3,840,168 | 10/1974 | Searle et al. | 228/2 |
| 3,920,504 | 11/1975 | Shoh et al. | 156/73.5 |
| 4,086,122 | 4/1978 | Bouyoucos et al. | 156/73.5 |
| 4,154,641 | 5/1979 | Hotton | 156/73.5 |

FOREIGN PATENT DOCUMENTS

| | | | |
|---|---|---|---|
| 2312341 | 12/1976 | France | 156/580 |
| 1233378 | 5/1971 | United Kingdom. | |
| 1436217 | 5/1976 | United Kingdom. | |

*Primary Examiner*—Michael G. Wityshyn
*Attorney, Agent, or Firm*—Ervin B. Steinberg; Philip J. Feig

[57] ABSTRACT

A method of friction welding thermoplastic materials, such as a reinforcing plate to the inner surfaces of oppositely disposed legs of a generally U-shaped workpiece, wherein a flexible force applying means applies a force in a direction normal to the direction of relative motion between the parts but in the plane of the mating surfaces for urging the legs of the U-channel into intimate contact with the edges of the reinforcing plate. During a weld time interval the parts undergo relative linear reciprocating motion while being urged in intimate contact by the flexible force applying means which causes the mating surfaces to soften under the influence of friction. After the weld interval, the parts are returned to their original position and are held in forced contact for a time sufficient for the mating surfaces to solidify. Upon solidification the force ceases and the welded parts are removed from the apparatus.

5 Claims, 6 Drawing Figures

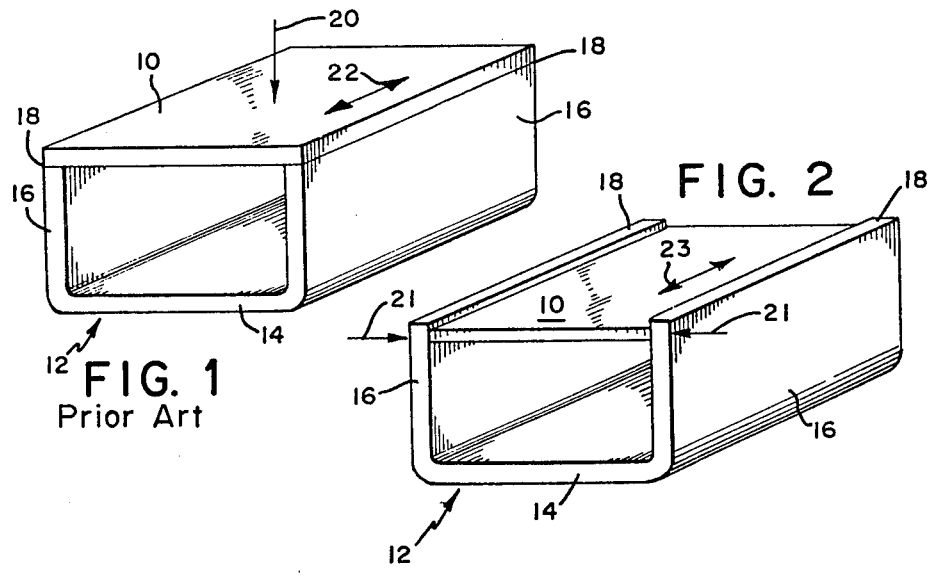
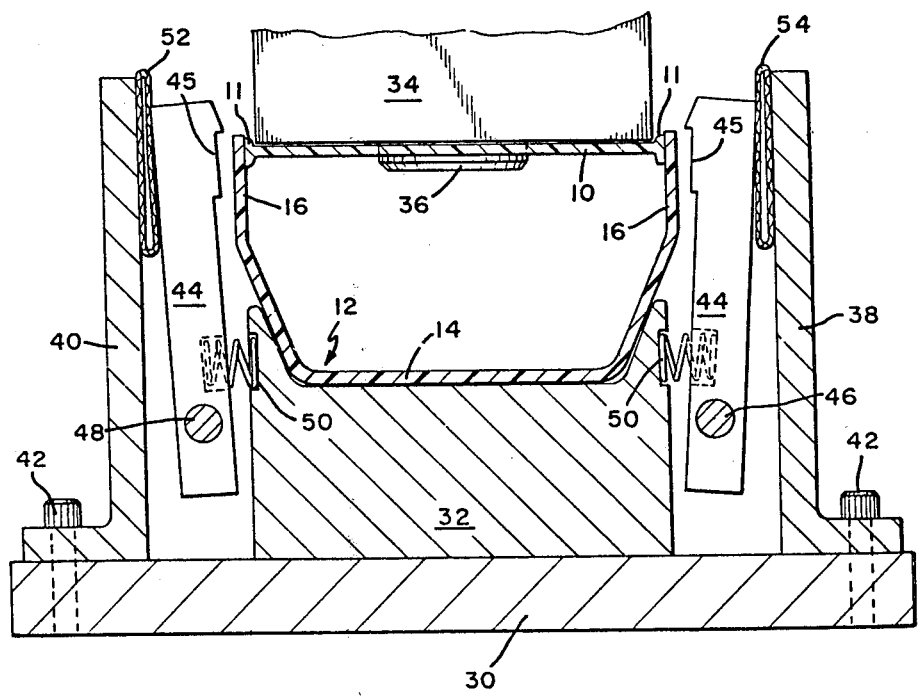

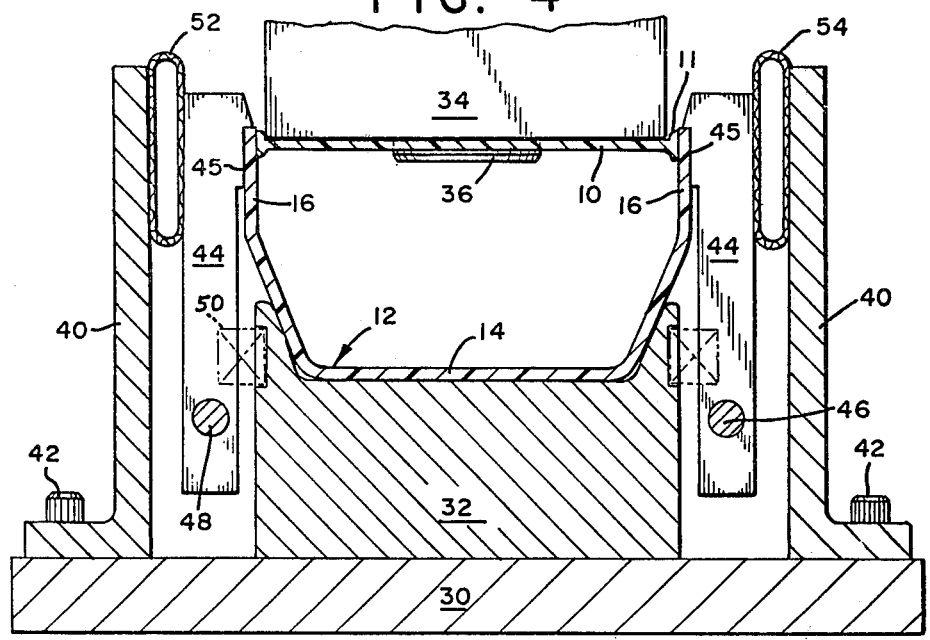
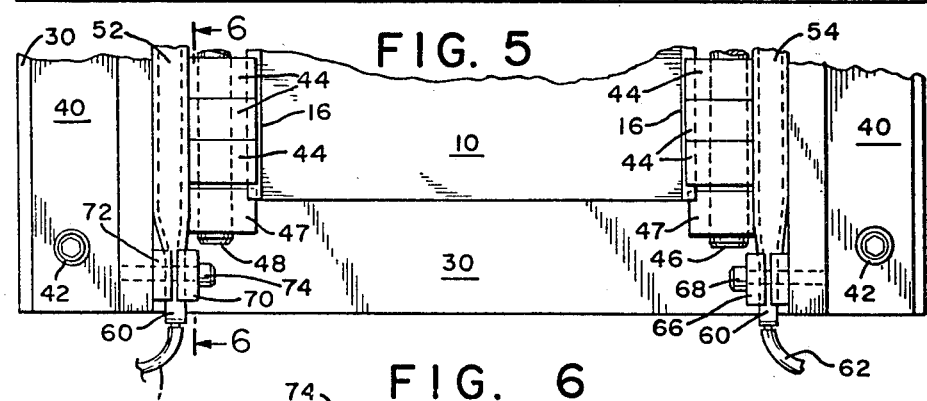
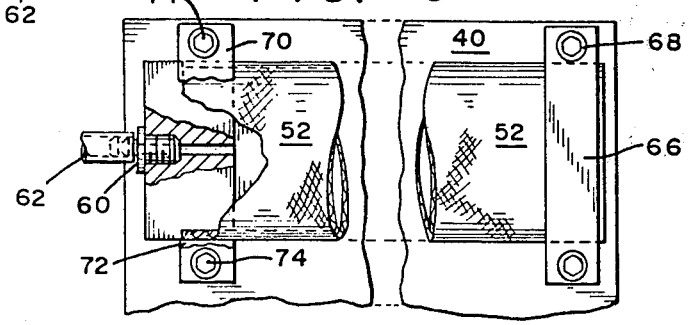

METHOD OF FRICTION WELDING

This application is a division of application Ser. No. 06/273,628, filed June 15, 1981, now U.S. Pat. No. 4,352,711.

SUMMARY OF THE INVENTION

This invention concerns a method for joining thermoplastic materials by the friction welding technique and more specifically relates to a method for friction welding a reinforcing plate to the inner surfaces of oppositely disposed legs of a generally U-shaped workpiece.

Apparatus for friction welding are well known. For example, in U.S. Pat. No. 3,920,504 entitled "Friction Welding Apparatus", by A. Shoh et al, dated Nov. 18, 1975 and assigned to the assignee of the present invention an apparatus is described in which reciprocating translating motion is used for welding two thermoplastic parts along a common interface surface. Another friction welding apparatus is shown in U.S. Pat. No. 3,840,168 entitled "Friction Welding Apparatus", by J. G. Searle et al, dated Oct. 8, 1974. These patents are incorporated herein by reference.

In the prior art it has been the usual practice to fasten a cover plate to the edges of the upstanding leg members of a substantially U-shaped workpiece to close the U-shaped channel. In the present invention, it is desired to weld a stiffening plate between the opposing inner surfaces of the upstanding leg members to thereby rigidify and strengthen the channel member. It has been found that when using the present arrangement, leg members inclined at angles of up to 20 degrees may be welded to a reinforcing plate.

In a preferred application, the generally U-shaped channel comprises an automobile bumper and the plate is a reinforcing plate to strengthen the bumper to improve its impact strength.

In the prior art, a first workpiece to be welded is disposed in a fixture and held stationary. A second workpiece to be joined to the stationary workpiece is urged into intimate contact with the mating surface of the stationary workpiece. The two workpieces are caused to undergo relative linear reciprocating motion in the plane of the abutting mating surfaces. In order to provide frictional heat the parts are urged together under the influence of a force applied in a direction normal to the plane of the mating surface. The described method is known and is used, for example, to weld a cover over a U-shaped channel.

In the present apparatus, the workpieces are also placed in intimate contact and the parts undergo relative linear reciprocating motion. However, in accordance with the novel arrangement described hereafter the force urging the workpiece into intimate contact is applied in a direction normal to the direction of motion, but in the plane of the mating surface. In this manner, a stiffening plate is welded within the U-shaped channel as contrasted with welding the plate as a cover over the channel.

In an improvement to the heretofore known Shoh apparatus, flexible force applying means are used to urge the workpieces into intimate contact. A flexible force applying means, such as a hose adapted to be inflated by a fluid, is disposed in juxtaposition to the outer surfaces of the upstanding leg members of a U-shaped channel. With the reinforcing plate disposed inside the channel at a height medially disposed along the leg members, the flexible force applying means is inflated. As the force applying means inflates, the leg members are urged toward each other and into intimate contact with the two lateral edges of the reinforcing plate. When the force applying means is fully inflated and the inner surface of each leg member is in intimate contact with the reinforcing plate, the U-channel is held substantially stationary while the plate is made to undergo linear reciprocating motion in a direction parallel to the longitudinal axis of the U-channel. In the preferred apparatus, the peak-to-peak displacement is in the order of one to three mm at a fixed frequency in the range between 100 to 240 Hertz. After a weld time interval sufficient for the mating surfaces to soften under the influence of friction, the plate is returned to its original position and the parts are held in intimate contact by the force applying means. After a time sufficient for the mating surfaces to solidify, the force applying means is deflated and the welded workpiece is removed from the friction welding apparatus.

The present invention provides the advantages of joining thermoplastic parts without the use of solvents, retaining the flash inside the U-channel workpiece, and joining workpieces in a manner to significantly enhance the strength of a U-shaped channel by welding a reinforcing plate to the inner surfaces of the upstanding leg members.

A principal object of this invention, therefore, is the provision of a method for friction welding a reinforcing plate to a substantially U-shaped channel.

Another object of the invention is the provision of a friction welding method in which workpieces are urged together in a direction normal to the axis motion but substantially in the plane of the mating surfaces of the workpieces.

A further object of the invention is the provision of a welding method employing resilient force applying means for urging the workpieces to be welded into intimate contact.

Further and still other objects of the invention will become more clearly apparent when the specification is read in conjunction with the accompanying drawings.

BRIEF DESCRIPTION OF THE DRAWINGS

FIG. 1 is a perspective view of a closed U-channel welded in accordance with the prior art;

FIG. 2 is a perspective view of a reinforced U-channel welded in accordance with the present invention;

FIG. 3 is a side elevational view, partly in section, of the welding apparatus with the reinforcing plate in place for welding the reinforcing plate to the inner surfaces of a U-channel;

FIG. 4 is a view similar to FIG. 3, but with the resilient force applying means inflated in order to apply engagement pressure between the reinforcing plate and the inner leg surfaces of the U-channel;

FIG. 5 is a top plan view for illustrating the means for applying an engagement force between the reinforcing plate and the leg members of the U-channel, and FIG. 6 is a view along line 6—6 in FIG. 5.

DETAILED DESCRIPTION OF THE INVENTION

Referring now to the drawings and FIG. 1 in particular, there is shown the prior art method of welding a thermoplastic reinforcing plate 10 to a thermoplastic U-channel 12 having a base portion 14 and two upstanding leg members 16. The rectangular reinforcing plate 10 is joined to the U-channel along the exposed top surfaces 18 of the upstanding leg members 16. Normally, the plate 10 and leg members 16 are urged into forced intimate contact with each other in the direction of arrow 20 and the plate 10 and the U-channel 12 are subjected to relative linear reciprocating motion in the direction of arrow 22, i.e. in a plane normal to the direction of the force urging the plate and the channel together. A suitable apparatus for joining the plate 10 to channel 12 in the manner described is disclosed in U.S. Pat. No. 3,920,504 supra. In the preferred example and using the apparatus indicated, the U-channel 12 would be held stationary while the plate 10 is subjected to linear reciprocating motion along the direction indicated by arrow 22 to cause a weld between the underside of the plate 10 and the upstanding surfaces 18 of the legs 16.

While the prior art assembly provides a degree of support for the U-channel, it is more desirable to recess the plate 10 within the U-channel and provide a joint as more clearly illustrated in FIG. 2. In this embodiment the lengthwise edges of the reinforcing plate 10 are welded to the inner surface of each of the upstanding leg members 16. In order to perform this weld, force means are required to urge each of the upstanding leg members 16 against the lengthwise edges of the plate 10 in the direction of arrows 21 in order that a weld is achieved. As stated before, in the preferred example the U-channel is held stationary while the plate 10 is subjected to reciprocating linear motion in the direction of arrow 23 until softening of the thermoplastic occurs at the interface between the edges of plate 10 and the inner surface of the legs 16, whereupon the motion is stopped to permit solidification of the thermoplastic material to cause a welded joint. It will be apparent, of course, to those skilled in the art that in an alternative embodiment the plate 10 may be held still while the U-channel is subjected to reciprocating motion.

Referring now to FIG. 3 which illustrates certain important portions of the friction welding apparatus, there is shown a base plate 30 which supports a fixture 32 which, in turn, is shaped to support the U-shaped channel 12. The reinforcing plate 10 is shown in place for being welded to the respective inner surfaces of each of the upstanding leg members 16. In order to provide an improved weld, the lateral edges of the reinforcing plate 10 may terminate in flared edges as indicated by numeral 11. The reinforcing plate is held in position by a fixture plate 34 having one or more protrusions 36 which penetrate through suitable apertures in the reinforcing plate 10 to align the plate 10 and to provide a positive drive for reciprocatingly moving the plate 10 in a direction as indicated by arrow 23 in FIG. 2. Moreover, vacuum means may be employed to hold the plate 10 against the underside of the fixture 34. The means for lowering the fixture plate 34 with reinforcing plate 10 attached thereto into the channel 12 and moving the fixture 34 relative to the stationary fixture plate 32 is illustrated and has been described in detail in the patent to Shoh supra.

In order to provide the necessary engagement force between the upstanding legs 16 and the flared edges 11 there is provided a pair of plates 38 and 40, each fastened to the base plate 30 by suitable screws 42. In addition, there is disposed on each side of fixture plate 32 a plurality of pivotly mounted fingers 44, the lower end of which is secured to a rod 46, 48 and the upper end being free to pivot into and out of engagement with the outer surface of the leg members 16 at the location where the weld is to be made. The rods 46, 48 are secured at each end to a block 47 which, in turn, is securely fastened to the base plate 30 by suitable screws. In order to provide proper contact each finger 44 has a suitable engagement surface 45 so shaped as to conform to the outer surface of leg 16 at the area where the force is to be applied. For instance, the fingers may be metal and the surfaces 45 may have a plastic facing to avoid marring of the workpiece.

Each of the fingers 44 is urged away from contact with the workpiece by means of a respective helical spring 50 secured in respective recesses in each finger 44 and the fixture 32. For providing engagement pressure between the plate 10 and the channel 12 along the flared edges 11 and the legs 16 there is provided a pair of flexible pressure applying means such as inflatable flexible hoses 52 and 54, one hose disposed behind each row of juxtaposed fingers 44. In a typical example, each hose is similar to a fire hose and inflatable by fluid means, preferably air pressure in the present embodiment.

Referring to FIG. 4, it will be seen that the hoses 52 and 54 have been inflated or pressurized causing the pressure fingers 44 to be moved against the force of the respective springs 50 to provide an engagement force to be effective between the flared edges 11 of the plate 10 and the inner surfaces of the legs 16 of the channel 12. The surfaces 45 of the fingers 44 urge the upper leg portions of each leg 16 against the respective flared edge 11 of the reinforcing plate 10. When the hoses 52 and 54 are inflated and this engagement pressure between the legs 16 and the plate 10 is present the movable fixture 34 can be reciprocated for causing frictional heat to be developed at the interface between the edges 11 of the plate 10 and the legs 16 of the U-shaped channel 12.

Referring now to FIG. 5 which is a top plan view there will be seen the horizontally disposed rods 46 and 48, each of which pivotally supports an array of juxtaposed fingers 44, one array on each side of the fixture plate 32. Each array of fingers 44 is operated for providing the engagement force by a respective inflatable hose 52 and 54. Each of the hoses, as seen also in FIG. 6 is coupled to an inflatable pressurized fluid source (not shown) coupled to the hose at one end by a suitable fitting 60 which in turn is provided with a flexible connection 62 which leads to suitable valve means not shown. The pressurizing and the bleeding of the pressurized hoses 52 and 54 by suitable valve means is well known in the art and requires no description. The far end of the hose is clamped off by means of suitable clamps 66 and screws 68 which are fastened into the side plate 40. Similarly, the fluid inlet end includes a pair of clamps 70 and 72 and suitable screws 74. The advantage of the inflatable hose resides in the fact that the pressure applied to the fingers 44, which in turn controls the static pressure applied to the workpieces during welding, is controllable so as to optimize the weld between the channel and the reinforcing plate. Moreover, the flexibility of the hose obviates the need for very accurate machining and assembling of the array fingers. Any minor variation in the thickness of the finger is automatically compensated for by the flexibility of the inflatable hose used for urging the finger against the outer surface of the respective leg 16.

It will be apparent that the use of a flexible hose 52 and 54 is only one of the pressure means which may be utilized. For example, if the U-channel and reinforcing plate have complex contours rather than straight parallel edges and surfaces as shown, multiple sections of hose and fingers in spaced relation to the workpiece contour can be employed to provide approximately equal pressure along the entire weld surfaces. In a further alternative embodiment, each finger 44 or group of fingers could be controlled by a fluid actuated piston and cylinder for providing selective pressure. Still other arrangements for providing engagement pressure are clearly usable.

In a still further modification, the fingers are omitted and the hoses are disposed opposite the U-channel for direct contact with the leg portions of the U-channel.

While there has been described and illustrated a preferred friction welding method and several variations thereof have been indicated, it will be apparent to those skilled in the art that further and still other variations and modifications may be made to the described method without deviating from the broad scope of the invention which shall be limited only by the scope of the appended claims.

What is claimed is:

1. A method of friction welding a thermoplastic reinforcing plate to a thermoplastic U-shaped channel, the latter including a base and two upstanding legs comprising:
   supporting said channel in a first support means;
   supporting said plate in a second support means within said channel in a manner to dispose each of the opposite lateral edges of said plate in abutting contact with a respective inside surface of each of said legs;
   applying a force to the outside surface of each of said legs for causing each of said legs to be in forced abutting surface contact with said plate along said two opposite edges of said plate, and
   causing said first and second support means to undergo relative linear reciprocating motion along an axis parallel to the longitudinal axis of said plate during a weld time interval for causing thermoplastic material along said respective abutting surface contacts to melt and upon cessation of said motion to rigidify whereby said plate becomes welded to said channel.

2. A method of friction welding as set forth in claim 1, said applying a force to the outside surface of each of said legs including using flexible pressure applying means adapted to conform to the outside surface of the respective legs.

3. A method of friction welding as set forth in claim 2, and inflating said flexible pressure applying means with a fluid for applying a force to the outside surface of the respective legs.

4. A method of friction welding as set forth in claim 1, said applying a force to the outside surface of each of said legs including using an array of juxtaposed fingers disposed for contacting the outside surface of said legs and said applying a force applying selective pressure to said fingers.

5. A method of friction welding as set forth in claim 1, wherein said second support means undergoes linear reciprocating motion relative to said first support means.

* * * * *